US007133852B2

(12) United States Patent
Kurokawa et al.

(10) Patent No.: US 7,133,852 B2
(45) Date of Patent: Nov. 7, 2006

(54) ELECTRICITY GENERATION EQUIPMENT MANAGEMENT SYSTEM

(75) Inventors: Tsutomu Kurokawa, Tokyo (JP); Shigeaki Sato, Tokyo (JP); Yoshiteru Misumi, Tokyo (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 09/976,259

(22) Filed: Oct. 12, 2001

(65) Prior Publication Data
US 2002/0123974 A1 Sep. 5, 2002

(30) Foreign Application Priority Data
Oct. 13, 2000 (JP) .............................. 2000-313232

(51) Int. Cl.
*G06Q 99/00* (2006.01)
(52) U.S. Cl. ..................................................... 705/412
(58) Field of Classification Search .................... 705/1, 705/400, 412, 34, 35, 36, 37, 39, 40, 413, 705/26; 700/286, 291, 295, 44, 45; 709/217, 709/219; 379/106.03; 340/870.02, 870.03, 340/310.01; 702/61, 62
See application file for complete search history.

(56) References Cited

U.S. PATENT DOCUMENTS

| | | | | |
|---|---|---|---|---|
| 5,168,208 A | * | 12/1992 | Schultz et al. | 322/25 |
| 5,237,507 A | * | 8/1993 | Chasek | 705/412 |
| 5,432,710 A | * | 7/1995 | Ishimary et al. | 705/412 |
| 5,699,276 A | * | 12/1997 | Roos | 705/412 |
| 5,852,658 A | | 12/1998 | Knight et al. | |
| 5,973,481 A | * | 10/1999 | Thompson et al. | 322/7 |
| 6,078,785 A | * | 6/2000 | Bush | 455/7 |
| 6,311,105 B1 | * | 10/2001 | Budike, Jr. | 700/291 |
| 6,327,541 B1 | * | 12/2001 | Pitchford et al. | 705/412 |

(Continued)

FOREIGN PATENT DOCUMENTS

| | | |
|---|---|---|
| CN | 1183860 A | 6/1998 |
| EP | 0 286 377 A2 | 10/1988 |
| FR | 2 689 333 A1 | 10/1993 |
| WO | WO-96/21264 A2 | 7/1996 |

(Continued)

OTHER PUBLICATIONS

Aiken et al. Energy Utilities in the Internet and NII: Users of Providers? 1995 Internet printout.*

(Continued)

*Primary Examiner*—Igor N. Borissov
(74) *Attorney, Agent, or Firm*—Darby & Darby

(57) ABSTRACT

A generator unit is installed locally to supply power to an electricity consumer. A management center monitors operation status of the generator unit and monitors the amount of electricity supplied to the electricity consumer by the generator unit. A service company performs maintenance and management for the generator unit based on instructions from the management center or the operation status of the generator unit. An electricity provider operating the generator unit bills the electricity consumer for an electricity supply service fee based on information sent to the management center. The resulting electricity generation equipment management system maintains and manages a generator unit without placing a burden on an electricity consumer, allowing efficient billing and payment of electricity supply service fees.

17 Claims, 3 Drawing Sheets

U.S. PATENT DOCUMENTS

| | | | |
|---|---|---|---|
| 6,396,839 B1 * | 5/2002 | Ardalan et al. | 370/401 |
| 6,441,505 B1 * | 8/2002 | Poletti et al. | 290/1 A |
| 6,583,521 B1 * | 6/2003 | Lagod et al. | 307/70 |
| 6,589,682 B1 * | 7/2003 | Fleckner et al. | 429/34 |
| 2002/0040356 A1 * | 4/2002 | Gluck et al. | 705/412 |
| 2004/0167853 A1 * | 8/2004 | Sharma | 705/40 |

FOREIGN PATENT DOCUMENTS

| | | |
|---|---|---|
| WO | WO-00/04427 A1 | 1/2000 |

OTHER PUBLICATIONS

Canadian Office Action dated Apr. 19, 2006 for CA2,358,745.

Communication pursuant to Article 96(2) EPC dated Jul. 5, 2006 for European Patent Application No. 01 308 683.0.

Notification of First Office Action (PCT Application) for Chinese Patent Application No. 01136411.4 issued by Chinese Patent Office on Mar. 10, 2006.

* cited by examiner

ELECTRICITY GENERATION EQUIPMENT MANAGEMENT SYSTEM

BACKGROUND OF THE INVENTION

The present invention relates to an electricity generation equipment management system that efficiently maintains and manages operation of a generator unit installed in a region where laying of electricity cable from a public electricity company is difficult. The present invention also relates to an electricity generation equipment management system that supplies power to a specific electricity consumer, allowing for reliable billing and payments of electricity supply service fees between the electricity consumer and an electricity provider operating the generator unit.

Electricity generated using nuclear power, thermal power, water power, or the like serves a very important role as a source of daily energy. There is also widespread use of electrical devices, actuating devices in various machinery, information communication devices, and the like that use this electricity as an energy source to provide light or heat.

This type of electricity is generated by power companies, which supply electricity consumers, e.g., businesses and standard households, via predetermined electrical cables. The electricity consumers pay the power companies a fee based on the amount of electricity used.

However, in places such as farms in large plains or remote islands, the laying of electrical cable from the power company involves enormous installation costs. This makes providing electricity to these consumers very difficult in practical terms. Electricity consumers in these remote areas can install a generator unit, using petroleum as an energy source, to serve as a home generator. Alternatively, solar energy, wind energy, or geothermal energy can be used to generate electricity.

However, installing home generators involves very high installation costs. Furthermore, there are very high operation costs (running costs) for monitoring the operation status of a home generator and running the generator in a stable and efficient manner while providing adequate maintenance. Thus, the efficient use of electrical energy is made very difficult.

OBJECTS AND SUMMARY OF THE INVENTION

It is an object of the present invention to provide an electricity generation management system which overcomes the foregoing problems.

It is a further object of the present invention to provide an electricity generation equipment management system that allows power generated from a generator unit installed locally to be used in the same manner as power supplied from an electric company, even if the laying of electric cable from the electricity company is difficult in the region.

Another object of the present invention is to provide an electricity generation equipment management system that maintains and manages a generator unit installed locally in a region for which laying electrical cable from the electricity company is difficult, without placing a burden on the electricity consumer; and that can efficiently handle billing and payments of electricity supply service fees charged to the electricity consumer.

Briefly stated, the present invention provides a generator unit installed locally to supply power to an electricity consumer. A management center monitors operation status of the generator unit and monitors the amount of electricity supplied to the electricity consumer by the generator unit. A service company performs maintenance and management for the generator unit based on instructions from the management center or the operation status of the generator unit. An electricity provider operating the generator unit bills the electricity consumer for an electricity supply service fee based on information sent to the management center. The resulting electricity generation equipment management system maintains and manages a generator unit without placing a burden on an electricity consumer, allowing efficient billing and payment of electricity supply service fees.

In order to achieve the objects described above, an electricity generation equipment management system according to the present invention includes a locally installed generator unit operated by an electricity provider, supplying electricity to a specific electricity consumer; and a management center monitoring operation status of the generator unit, monitoring an amount of electricity supplied to the specific electricity consumer by the generator unit. The electricity provider bills an electricity supply service fee to the specific electricity consumer based on information received from the management center via a predetermined network system, and the electricity consumer pays the service fee.

In an electricity generation equipment management system according to an embodiment the present invention, a service company maintains and manages operation of the generator unit based on instructions from the management center or the operation status of the generator unit.

Thus, in the electricity generation equipment management system according to the present invention, a generator unit for supplying electricity to the electricity consumer is set up in association with the electricity provider instead of the electricity consumer. The operation status of the generator unit and the amount of electricity supplied to the electricity consumer is monitored by a management center via a predetermined communication circuit. A service company that maintains and manages the operations of the generator unit receives maintenance/management instructions from the management center or receives information about operation status of the generator unit. Based on this, the service company performs maintenance and management operations for the generator unit. Apart from the maintenance and management of the generator system performed by the service company, the electricity provider bills and receives payment from the electricity consumer for an electricity supply service fee based on the amount of power supplied to the electricity consumer or the like.

The generator unit can be, for example, a fuel cell electricity generation device that uses LPG (liquid petroleum fuel), NP (natural gas), or the like as fuel to generate electricity. The service company includes a fuel supply company supplying fuel (LPG or NP) to the fuel cell electricity generation device (fuel cell system); and a maintenance/management company performing maintenance on the fuel cell electricity generation device and responding to irregularities in the fuel cell electricity generation device.

According to another aspect of the electricity generation equipment management system according to the present invention, the generator unit is especially effective when used locally by a specific electricity consumer as a home generator system in a region where laying or maintaining electrical cable from a public electricity company is difficult, e.g., in a wide plain or a remote island.

In this case, it would be desirable for the management center to use wireless communication equipment to collect information from the generator unit regarding operation status of the generator unit and regarding an amount of electricity supplied to the specific electricity consumer. The electricity provider would then use, for example, the Internet for billing and payment of an electricity supply service fee for the specific electricity consumer.

Furthermore, according to another aspect of the present invention the electricity generation equipment management system includes a locally installed fuel cell electricity generating device supplying electricity to a specific electricity consumer; a management center monitoring an operation status of the fuel cell electricity generating device via a predetermined network; and a service company maintaining and operating the fuel cell electricity generating device based on instructions received from the management center or the operation status of the fuel cell electricity generating device.

The service company includes a database, storing information about irregularities issued from the fuel cell electricity generating device in association with information relating to a service company corresponding to the irregularity information; and means for notifying the service company associated with the irregularity by looking up the database if an irregularity in the fuel cell electricity generating device is detected. Notifications to the service company regarding irregularities are provided via e-mail and includes information such as the model type of the fuel cell electricity generating device in which the irregularity occurred, the site location (address), the nature of the irregularity, and the like.

The above, and other objects, features and advantages of the present invention will become apparent from the following description read in conjunction with the accompanying drawings, in which like reference numerals designate the same elements.

DETAILED DESCRIPTION OF THE INVENTION

Referring to the figures, the following is a description of an electricity generation equipment management system according to an embodiment of the present invention.

Figure 1:
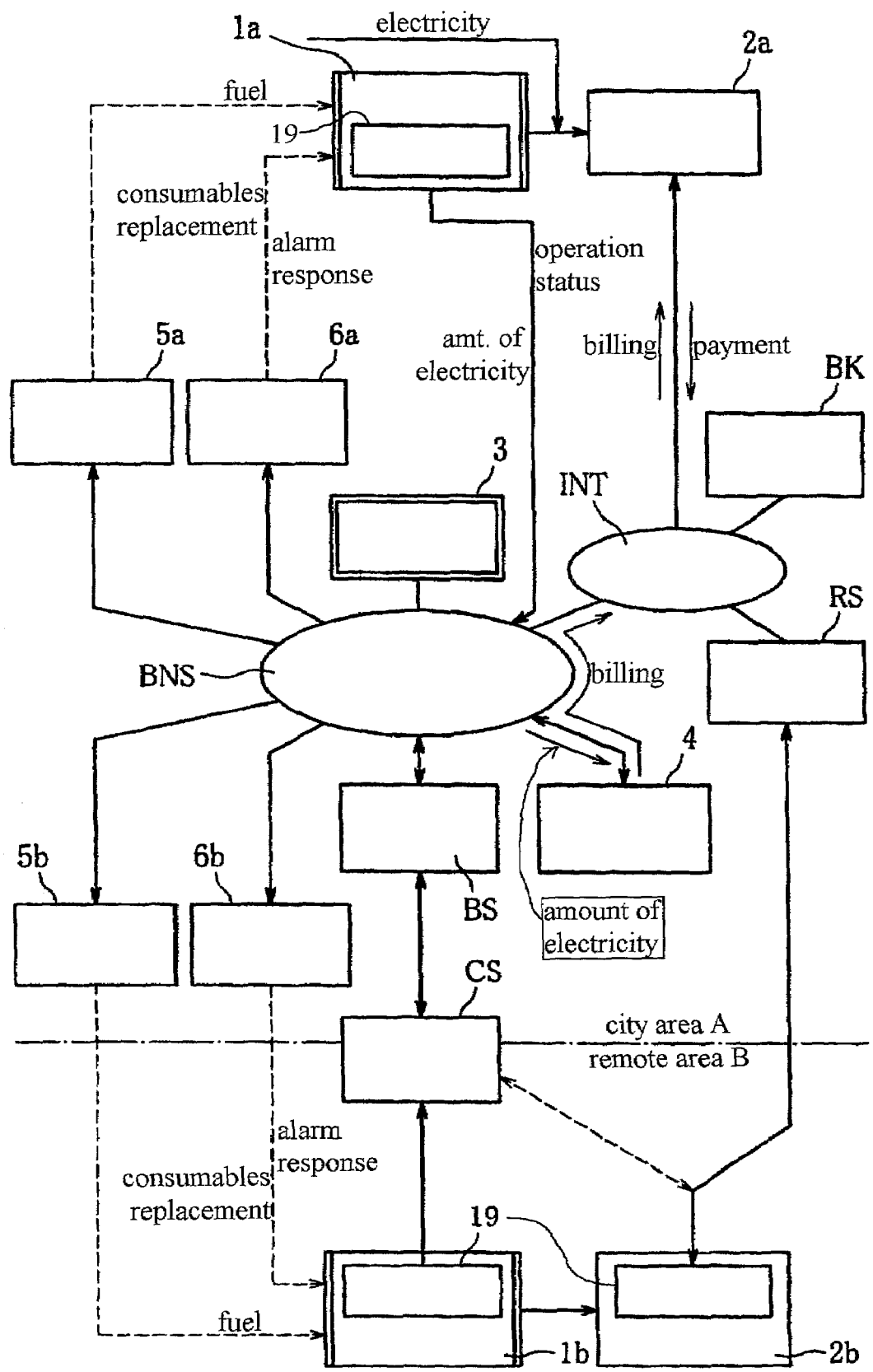
FIG. 1 is a schematic drawing of the overall architecture of an electricity generation equipment management system according to an embodiment of the present invention.

Referring to FIG. 1, there is shown the schematic architecture of an electricity generation equipment management system according to this embodiment. Electricity generation units $1a$, $1b$ are disposed separately and are associated with electricity consumers $2a$, $2b$, e.g., standard households. Electricity generation units $1a$, $1b$ supply power to the electricity consumers $2a$, $2b$ respectively. The electricity generation unit $1a$ is installed locally as a home electricity generator for a standard household (electricity consumer $2a$) located in a city area A in an electricity service area to which power from a public power company (not shown in the figure) can be provided via power cables. Electricity generation unit $1b$ is installed locally as a generator for a standard household (electricity consumer $2b$) located in a remote area B, e.g., a remote island or large plain for which installation of power cables from a public power company is difficult.

Figure 2:
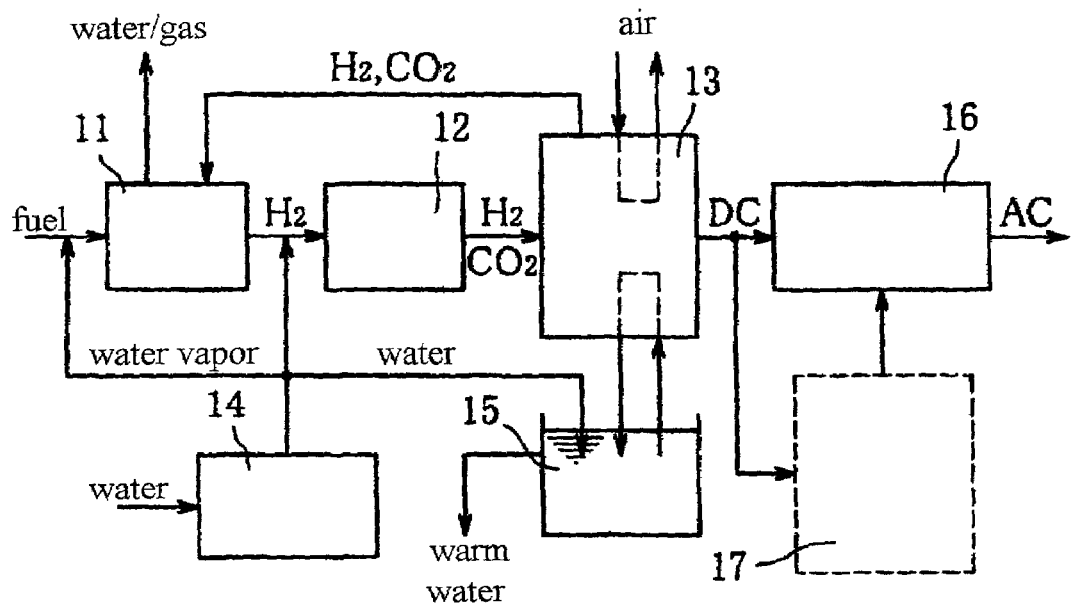
FIG. 2 is a schematic drawing of the architecture of a fuel cell generator, which is one example of a generator unit.

Referring to the schematic architecture shown in FIG. 2, electricity generation units $1a$, $1b$ are formed as fuel cell generators (fuel cell systems) in which LPG (liquid petroleum gas) or NP (natural gas) is used as fuel and an electrochemical reaction is performed with the hydrogen in the fuel and oxygen in air to generate electricity (power). Briefly, this fuel cell generator is essentially formed from a fuel reforming device 11, a carbon monoxide (CO) transformer 12, and a fuel cell 13. Also included are a water processor 14, a cooling water tank 15, and a DC-AC converter (inverter) 16.

Fuel reforming device 11 performs vapor reformation on the LPG or NP supplied as fuel to provide a gas having hydrogen as its primary component. More specifically, the LPG or the NP is heated using a heat exchanger (not shown in the figure) or the like. A water-adding/desulfurizing device (not shown in the figure) is used to eliminate sulfur components contained in the gas. Then, the gas is sent to fuel reforming device 11 along with water vapor, providing a gas having hydrogen ($H_2$) as its main component. Then, this hydrogen gas is sent to carbon monoxide transformer 12, where the carbon monoxide (CO) contained in the gas is converted to carbon dioxide ($CO_2$). The hydrogen gas processed in this manner is then sent to the fuel electrode of fuel cell 13 while air is sent to the air electrode of fuel cell 13 simultaneously. The oxygen in this air and the hydrogen in the hydrogen gas forms an electrochemical reaction that generates electricity (direct current electricity).

Hydrogen is consumed in fuel cell 13 in the by the electrochemical reaction (e.g., 80%), and the remaining hydrogen is discharged along with the carbon dioxide as an unreacted gas. This unreacted gas is returned to fuel reforming device 11 to serve as a heat source.

The cooling device built into fuel cell 13 cools fuel cell 13 by introducing cooling water from cooling tank 15. The cooling water that is heated by fuel cell 13 then returns to cooling tank 15 by way of the heat exchanger (not shown in the figure), thus allowing it to be used for both heating the hydrogen gas and cooling the heated water. Water processor 14, described above, supplies water to cooling tank 15 and serves as a water source for providing the water vapor sent to fuel reforming device 11. Water processor 14 does this by, for example, purifying tap water or well water.

The direct current electricity (DC) generated by fuel cell 13 is converted using DC-AC converter 16 formed from an inverter to provide an alternating current (AC) at a predetermined frequency and voltage. This is sent out as the generated output to electricity consumers $2a$, $2b$.

Fuel cell generators formed in this manner may be equipped with a backup power supply 17 that includes a secondary battery. Backup power supply 17 stores electrical energy by being charged by the output from fuel cell 13. If there is an irregularity in fuel cell 13, or if there is a sudden increase in power consumption that cannot be met by the output, electrical energy from backup power supply 17 is sent to DC-AC converter 16 in place of fuel cell 13. This provides output of AC power for a predetermined length of time. This type of backup power supply 17 provides backup over a predetermined period in case of a failure due to a irregularity in the fuel cell generator or due to a spike in power consumption, thus guaranteeing a stable supply of power to electricity consumers 2a, 2b.

Referring back to FIG. 1, characteristic features of a generator equipment management system will be described. A management center 3 is disposed in the city area A to monitor the operations of generator units 1a, 1b, and to monitor the power supplied to electricity consumers 2a, 2b from generator units 1a, 1b.

City area A is also generally equipped with an electricity provider 4 operating generator units 1a, 1b, and service companies, providing maintenance and management for generator units 1a, 1b. These service companies can include fuel supply companies 5a, 5b supplying fuel by delivering fuel containers (tanks) filled to a predetermined pressure to the sites of generator units (fuel cell generators) 1a, 1b. These service companies can also include maintenance management companies 6a, 6b, providing maintenance operations such as going to the sites of generator units (fuel cell generators) 1a, 1b when there is an irregularity in a fuel cell generator and re-filling or replacing consumables in the fuel cell generators.

Management center 3 provides unified management over a predetermined management network system BNS by providing information communication between generator units 1a, 1b, electricity provider 4, fuel supply companies 5a, 5b, and maintenance/management firms 6a, 6b. Establishing a direct information communication link between generator unit 1b and management network system BNS is difficult since generator unit 1b is installed in remote area B, where even the laying of power cables is difficult. Thus, information communication is provided, for example, using a communication base station BS connected to management network system BNS via a communication satellite CS.

Management center 3 is entrusted by electricity provider 4 to provide operation management over generator units 1a, 1b. This operations management is performed in the following manner. To provide a first feature, management center 3 collects, via management network system BNS, information regarding the operation status of generator units 1a, 1b, described later; and information regarding the amount of power supplied to power consumers 2a, 2b. Then, the information collected from generator units 1a, 1b is organized by generator unit and stored, thus allowing the activity status of generator units 1a, 1b to be monitored individually.

To provide a second feature, management center 3 reports to electricity provider 4, via management network system BNS, regarding the amount of power used by electricity consumers 2a, 2b, i.e., the amount of power supplied individually by generator units 1a, 1b. Furthermore, to provide a third feature, management center 3 uses management network system BNS to instruct fuel supply companies 5a, 5b to provide fuel to generator units 1a, 1b. Furthermore, to provide a fourth feature, management center 3 instructs maintenance/management companies 6a, 6b to respond to irregularities in generator units 1a, 1b and to re-fill/replace consumables and the like.

The collection of information from generator units 1a, 1b according to the first feature described above will be described in more detail.

Figure 3:
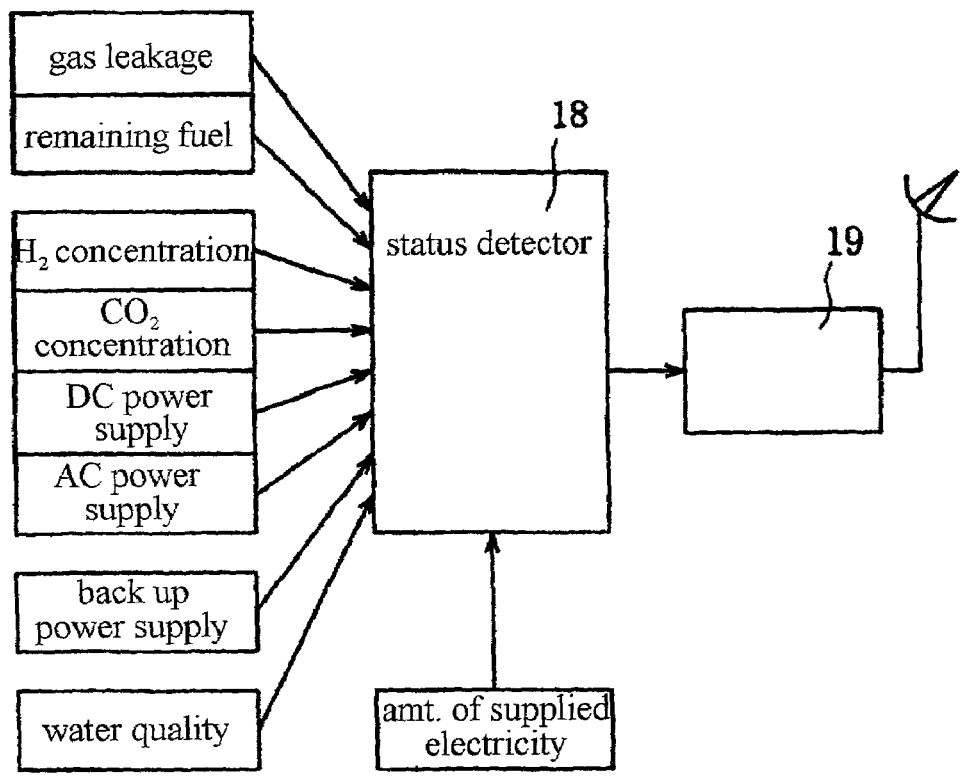
FIG. 3 is a drawing illustrating sample operation status information for a generator unit monitored by a management center.

Referring to FIG. 3, if generator units 1a, 1b are formed as fuel cell generators as described above, generator units 1a, 1b are equipped with sensing features. The sensing mechanism is equipped with a status detector 18 that detects the remaining fuel (LPG or NP) supplied in the fuel tanks described above. Status detector 18 also detects gas leaks in the fuel gas supply system between fuel reforming device 11 and fuel cell 13. Status detector 18 also detects the concentration of hydrogen in the hydrogen gas output from fuel reforming device 11; the concentration of carbon monoxide in the hydrogen gas from carbon monoxide (CO) transformer 12; the output voltage (DC voltage) from fuel cell 13; and output voltage (AC voltage) from AC-DC converter 16. Furthermore, status detector 18 also detects the charge in backup power supply 17; information about the water quality and the like of the processed water from water processor 14; and the amount of power supplied to power consumers 2a, 2b from the fuel cell generator devices.

The information detected by status detector 18, along with ID information assigned to the corresponding generator unit, is sent to management center 3 via a communication device 19 at regular intervals, e.g., once a day. For generator unit 1b, installed in the remote area B, information is sent to management center 3 via communication satellite CS as described above. Of course, it would also be possible to have management center 3 access communication device 19, which would then send the detection information collected up to that point or the detection information for the time of access.

Management center 3 receives detection information relating to activity status from generator units 1a, 1b in this manner.

Figure 4:
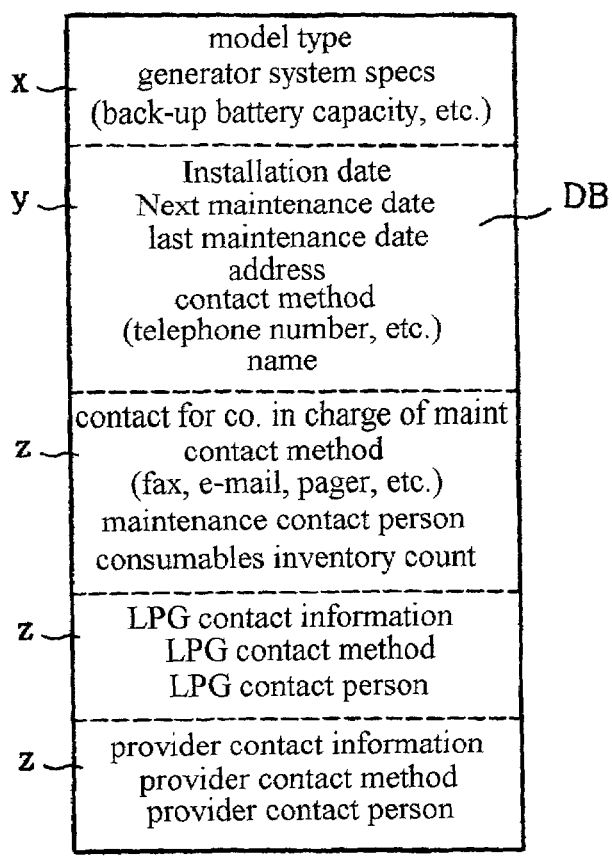
FIG. 4 is a drawing illustrating a sample database in a management center for managing operations of a generator unit.

Referring to FIG. 4, management center 3 is equipped with a database DB that manages device specifications x for generator units 1a, 1b; maintenance information y; and information z regarding the service companies performing maintenance/management operations; and the like. Management center 3 uses this database DB to provided unified management over the information collected from generator units 1a, 1b as described above. Furthermore, by looking up the database DB information, management center 3 determines where to report the detected information regarding the activity status of generator units 1a, 1b collected as described above. This information is sent to the corresponding department (service company).

More specifically, management center 3 may, for example, notify the amount of power supplied to power consumers 2a, 2b to electricity provider 4 on a monthly basis. Also, management center 3 informs fuel supply companies 5a, 5b about the remaining fuel in generator units (fuel cell generators) 1a, 1b, and instructs them to provide re-fills. Furthermore, management device 3 sends information to maintenance/management companies 6a, 6b, e.g., information about problems or irregularities in generator units (fuel cell generators) 1a, 1b as determined by analysis of the activity information described above, and instructs them to provide maintenance operations, e.g., respond to the problems.

It is also possible to have the activity information itself (the raw data) sent from management center 3 to maintenance/management companies 6a, 6b, and to instruct maintenance/management companies 6a, 6b to perform analysis and provide maintenance based on the analysis.

Figure 5:
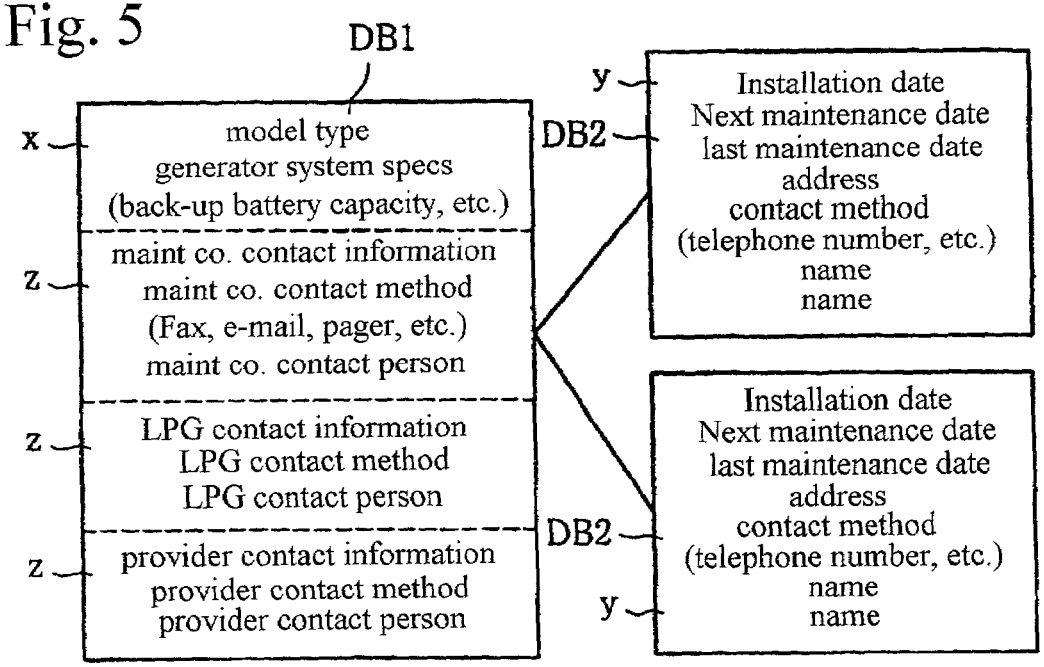
FIG. 5 is a drawing illustrating a sample database, distributed between a management center and service companies, for managing information to operate generator units.

Referring to FIG. 5, management center 3 prepares a set of relational databases. A database DB1 contains machine specifications x and information destinations z. Database DB2 contains maintenance contents y for the individual generator units (fuel cell generator) 1a, 1b handled by maintenance/management companies 6a, 6b. This allows management information to be distributed between multiple databases DB1, DB2.

Fuel supply companies 5a, 5b then respond to the fuel supply instructions from management center 3 and supply fuel (LPG or NP), i.e., deliver fuel tanks, to their respective generator units (fuel cell generators) 1a, 1b. Based on maintenance instructions or information about irregularities received from management center 3, maintenance/management companies 6a, 6b go on-site and provide maintenance to their respective generator units (fuel cell generators) 1a, 1b. More specifically, failed or defective sections in the fuel cell generators are repaired or replaced and consumables are replaced or re-filled.

In response to information from management center 3 regarding the amount of power supplied, electricity provider 4 bills electricity consumers 2a, 2b for electricity supply services. The electricity supply service fees vary according to the provider contract. For example, a set electricity fee is associated with the amount of electricity supplied. Additional charges may optionally be applied for fuel supplied to the fuel cell generators and for consumables. In fixed-rate contracts, a fixed rate is charged up to a predetermined amount of power described in the contract, and additional power used is charged with an additional fee. Essentially, the electricity supply service fee is charged according to the provider contract, based on the amount of power used by electricity consumers 2a, 2b, the operating costs of the fuel cell generators, and the like. Accounting operations are carried out by receiving the electricity supply service fees from electricity consumers 2a, 2b.

The billing and payment of these electricity supply service fees can be performed through the mailing of bills and the depositing of the fees. However, it is also possible to use the Internet INT as shown in FIG. 1. In this case, a virtual financial institution BK in the Internet INT is used to provide transactions with electronic money information. The use of this type of transaction format simplifies billing and payment of electricity supply service fees, especially for power consumer 2b in remote area B. In this case, power consumer 2b connects to the Internet INT via communication satellite CS or a wireless station RS.

With the generator equipment management system described above, electricity is supplied using locally installed generator units 1a, 1b for electricity consumers 2a, 2b. This allows generator units 1a, 1b to be used efficiently as home generators. In particular, in remote area B, where laying of electricity cables is difficult, power is supplied relatively inexpensively and easily from generator unit 1b installed for electricity consumer 2b.

The operation status of generator units 1a, 1b are monitored by management center 3, and, when necessary, instructions are sent to fuel supply companies 5a, 5b and maintenance/management companies 6a, 6b to supply fuel (LPG or NP) or provide maintenance for generator units 1a, 1b. As a result, generator units 1a, 1b easily provide stable and efficient operations. Electricity accounting operations between electricity consumers 2a, 2b and electricity providers 6, involving the billing and payment for the amount of electricity supplied (amount of electricity used), are performed separately from the management operations of generator units 1a, 1b described above. Thus, management center 3 is used by electricity provider 6 in an effective way to operate generator units 1a, 1b.

The present invention is not restricted to the embodiment described above. For example, generator units 1a, 1b can generate electricity using micro-generator turbines fueled by petroleum, solar power, wind power, geothermal power, or the like. In these cases, it is necessary to provide adequate consideration of how the power supply will be backed up if these natural energy sources are interrupted. In particular, there will be a need to back up the power supply over long intervals, so the power capacity (charge capacity) of backup power supply 17 must be sufficiently large.

Maintenance operations for generator units 1a, 1b do not have to all be handled by service companies. Simple operations that can be performed by electricity consumers 2a, 2b may be dealt with by sending maintenance information and instructions to electricity consumers 2a, 2b from management center 3, e.g., via the Internet INT. Furthermore, maintenance operations for generator units 1a, 1b can be carried by the maintenance management companies 6a, 6b at fixed intervals, while irregularities, such as gas leaks, are dealt with when they occur. Other changes can be implemented as well as long as they do not depart from the spirit of the present invention.

With the present invention as described above, electricity is supplied in a stable manner from a generator unit installed for an electricity consumer, even if laying of electricity cables from a public power company is difficult. Furthermore, the operation status of the generator unit is monitored by a management center. Based on this monitoring, instructions are sent to service companies to provide maintenance operations for the generator unit, e.g., supplying fuel and performing maintenance inspections. This allows the generator unit to be operated in an efficient manner. Furthermore, accounting operations for electricity supply service fees are performed between the electricity provider operating the generator unit and the electricity company. These accounting operations are performed separate from the operations/maintenance tasks for the generator unit. Thus, the electricity provider can conduct business in a reliable manner.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electricity generation equipment management system comprising:
    at least one generator unit, operated by an electricity provider, supplying electricity to at least one specific electricity consumer;
    a service company maintaining and managing operation of said at least one generator unit;
    a management center, monitoring an operation status of said at least one generator unit and monitoring an amount of electricity supplied to said at least one specific electricity consumer by said at least one generator unit;
    a database including a relationship data record indicating information regarding an association between the generator unit and a specific service company, and configured to store and manage information collected at the at least one generator unit, the information selected from at least one of detection information, generator unit specification information, maintenance information, and service company information;
    the management center being configured to access the database information so as to provide unified management over the information, and further configured to select the specific service company to receive instructions based on the association in the relationship data record;
    a system for communicating information between said management center and said electricity provider; and an Internet virtual financial institution that supports transactions that bill an electricity supply service fee to each of said at least one specific electricity consumer based on information received from said management center.

2. The electricity generation equipment management system according to claim 1, wherein said at least one generator unit is installed locally with respect to said at least one specific electricity consumer.

3. The electricity generation equipment management system according to claim 1, wherein there is provided one of said at least one generator unit for each one of said at least one specific electricity consumer.

4. The electricity generation equipment management system as described in claim 1 wherein:
said at least one generator unit is a fuel cell electricity generating device;
said service company includes a fuel supply company and a maintenance/management company;
said fuel supply company supplying fuel to said fuel cell electricity generating device; and
said maintenance/management company performing maintenance on said fuel cell electricity generating device and responding to irregularities in said fuel cell electricity generating device.

5. The electricity generation equipment management system as described in claim 2 wherein said at least one generator unit is used locally by said at least one specific electricity consumer as a home generator system.

6. The electricity generation equipment management system as described in claim 1 wherein said at least one generator unit is used locally by said at least one specific electricity consumer as a home generator system.

7. The electricity generation equipment management system as described in claim 2 wherein:
said at least one generator unit is installed for said at least one specific electricity consumer in a region where laying and maintaining electrical cable from said electricity provider is difficult; and
said management center uses wireless communication equipment to collect information from said at least one generator unit regarding operation status of said at least one generator unit and regarding an amount of electricity supplied to said at least one specific electricity consumer.

8. The electricity generation equipment management system as described in claim 7 wherein said electricity provider uses the Internet for billing and payment of said electricity supply service fee for said at least one specific electricity consumer.

9. The electricity generation equipment management system as described in claim 1 wherein:
said at least one generator unit is installed for said at least one specific electricity consumer in a region where laying and maintaining electrical cable from said electricity provider is difficult; and
said management center uses wireless communication equipment to collect information from said generator unit regarding operation status of said at least one generator unit and regarding an amount of electricity supplied to said at least one specific electricity consumer.

10. The electricity generation equipment management system as described in claim 9 wherein said electricity provider uses the Internet for billing and payment of said electricity supply service fee for said at least one specific electricity consumer.

11. An electricity generation equipment management system comprising:
at least one locally installed fuel cell electricity generating device supplying electricity to at least one specific electricity consumer;
a management center monitoring an operation status of said at least one fuel cell electricity generating device via a predetermined network;
a service company maintaining and operating said fuel cell electricity generating device based on instructions received from said management center;
a database including a relationship data record indicating information regarding an association between the fuel cell electricity generating device and a specific service company, and configured to store information about irregularities issued from said at least one fuel cell electricity generating device in association with information relating to said specific service company corresponding to said irregularity information;
means for selecting the specific service company to receive instructions based on the association in the relationship data record;
means for notifying said specific service company associated with said irregularity by looking up said database upon detection of an irregularity in said at least one fuel cell electricity generating device; and
an Internet virtual financial institution that supports transactions that bill each of said at least one specific electricity consumer a maintenance and operating service fee based on information stored in said database.

12. The electricity generation equipment management system according to claim 11, wherein there is provided one of said at least one fuel cell electricity generating device for each one of said at least one specific electricity consumer.

13. An electricity management system, comprising:
generating means for generating electricity;
said generating means being local to a specific electricity consumer, whereby power cables from an electricity provider to said specific electricity consumer are unnecessary;
monitoring means for remotely monitoring said generating means;
a storage means including a relationship data record indicating an association between the generating means and a specific service company, and configured to store and manage information collected at the generating means, the information selected from at least one of detection information, generator unit specification information, maintenance information, and service company information;
the management center configured to access the storage means information so as to provide unified management over the information, and further configured to select the specific service company to receive instructions based on the association in the relationship data record; and
billing means for charging said specific electricity consumer for a consumed amount of said electricity, the billing means including an Internet virtual financial institution.

14. The electricity management system as described in claim 13, wherein the management center is further configured to receive data from said monitoring means.

15. The electricity management system as described in claim 13 wherein:
said generating means includes a fuel cell electricity generating device;

said service company includes a fuel supply company and a maintenance/management company;

said fuel supply company supplying fuel to said fuel cell electricity generating device; and said maintenance/management company performing maintenance on said fuel cell electricity generating device and responding to irregularities in said fuel cell electricity generating device.

16. The electricity management system as described in claim 14, wherein said management center uses wireless communication equipment to collect information from said generating means regarding operation status of said generating means and regarding an amount of electricity supplied to said specific electricity consumer.

17. The electricity management system as described in claim 16 wherein said electricity provider uses the Internet for billing and payment of an electricity supply service fee for said specific electricity consumer.

* * * * *